(12) United States Patent
Liao

(10) Patent No.: US 6,742,795 B2
(45) Date of Patent: Jun. 1, 2004

(54) HANDLEBAR FOR TWO WHEELED VEHICLE

(75) Inventor: Jim Liao, Hsin Chu Hsien (TW)

(73) Assignee: Hsin Lung Accessories Co., Ltd., Hsin Chu Hsien (TW)

( * ) Notice: Subject to any disclaimer, the term of this patent is extended or adjusted under 35 U.S.C. 154(b) by 0 days.

(21) Appl. No.: 10/283,278

(22) Filed: Oct. 30, 2002

(65) Prior Publication Data

US 2004/0084873 A1 May 6, 2004

(51) Int. Cl.[7] .............................................. B62K 21/12
(52) U.S. Cl. ..................... 280/274; 280/281.1; 74/551.8
(58) Field of Search .................. 280/263, 267, 280/270, 274, 279, 281.1, 288.3; 74/551.1, 551.8

(56) References Cited

U.S. PATENT DOCUMENTS

| | | | | |
|---|---|---|---|---|
| 3,655,219 A | * | 4/1972 | Jacoby ....................... 280/279 |
| 4,610,836 A | * | 9/1986 | Wycech ....................... 264/313 |
| 5,093,990 A | * | 3/1992 | Klippel ....................... 29/897.2 |
| 5,255,487 A | * | 10/1993 | Wieting et al. ............. 52/735.1 |
| 5,257,552 A | * | 11/1993 | Boyer et al. ................ 74/551.1 |
| 5,408,900 A | * | 4/1995 | Marui ........................ 74/551.4 |
| 5,503,773 A | * | 4/1996 | Pearce et al. ............. 264/328.1 |
| 6,233,826 B1 | * | 5/2001 | Wycech ....................... 29/897.1 |
| 2002/0170378 A1 | * | 11/2002 | Flum et al. ................ 74/551.8 |

* cited by examiner

Primary Examiner—Avraham Lerner
(74) Attorney, Agent, or Firm—Troxell Law Office PLLC

(57) ABSTRACT

A handlebar for two-wheeled vehicle has a channel portion and two bent internal tubes wherein the channel portion has an internal diameter and the two bent internal tubes each have an external diameter slightly smaller than the internal diameter of the channel portion, the two bent internal tubes being disposed within the hollow portion with surfaces of the bent internal tubes in contact with the surface of the channel portion, whereby the thickness of the handlebar is increased in order to enhance the strength thereof.

1 Claim, 4 Drawing Sheets

HANDLEBAR FOR TWO WHEELED VEHICLE

BACKGROUND OF THE INVENTION

The present invention relates to a handlebar, more particularly, to a handlebar for two-wheeled vehicles such as motorcycles and bicycles, in which the strength of the handlebar is enhanced to prevent breakage thereof.

FIG. 1 shows the front view of a handlebar 1 which includes two gripping ends 2,3, a lateral tube 4 and two oblique tubes 5,6 between the gripping end 2(3) and the lateral tube 4,respectively. In normal riding of the two-wheeled vehicle, the upper body of a rider is supported by his two hands placed respectively at the gripping ends 2,3. After a period of time in use, the handlebar 1 tends to deform because of the constant load applied to the gripping ends 2,3. In order to overcome this problem, a reinforcement bar 7 which is attached to the handlebar 1 at the oblique tubes 5,6 is introduced. However, the constant load is concentrated on the two spots A,B of the oblique tubes 5,6 causing the breakage thereof.

SUMMARY OF THE INVENTION

To overcome the drawback of the conventional art, an object of the present invention is to provide a handlebar for two-wheeled vehicle which has enhanced strength thereof to prevent breakage of the handlebar.

To achieve the object mentioned above, the present invention provides a handlebar for a two-wheeled vehicle which comprises two gripping ends, a lateral tube, two oblique tubes between the gripping end and lateral tube, and a reinforcement bar having two free ends, wherein an angle portion is formed between one of the gripping ends and one of the oblique tubes while an other angle portion is formed between the other one of the gripping ends and the other one of the oblique tubes, and wherein the two free ends of the reinforcement bar is fixedly connected to the two oblique tubes, namely at the underside of the two angle portions, respectively, the handlebar further comprising a channel portion having an internal diameter and two bent internal tubes each having an external diameter slightly smaller than said internal diameter, wherein the two bent internal tubes are disposed within the hollow portion with surfaces of the bent internal tubes in contact with the surface of the channel portion, whereby the thickness of the two oblique tubes is increased in order to enhance the strength thereof.

BRIEF DESCRIPTION OF THE DRAWING

The above objects and advantages of the present invention will become more apparent by the following detailed description of a preferred embodiment thereof in conjunction with the accompanying drawings, in which.

DETAILED DESCRIPTION OF THE PREFERRED EMBODIMENT

Figure 1:
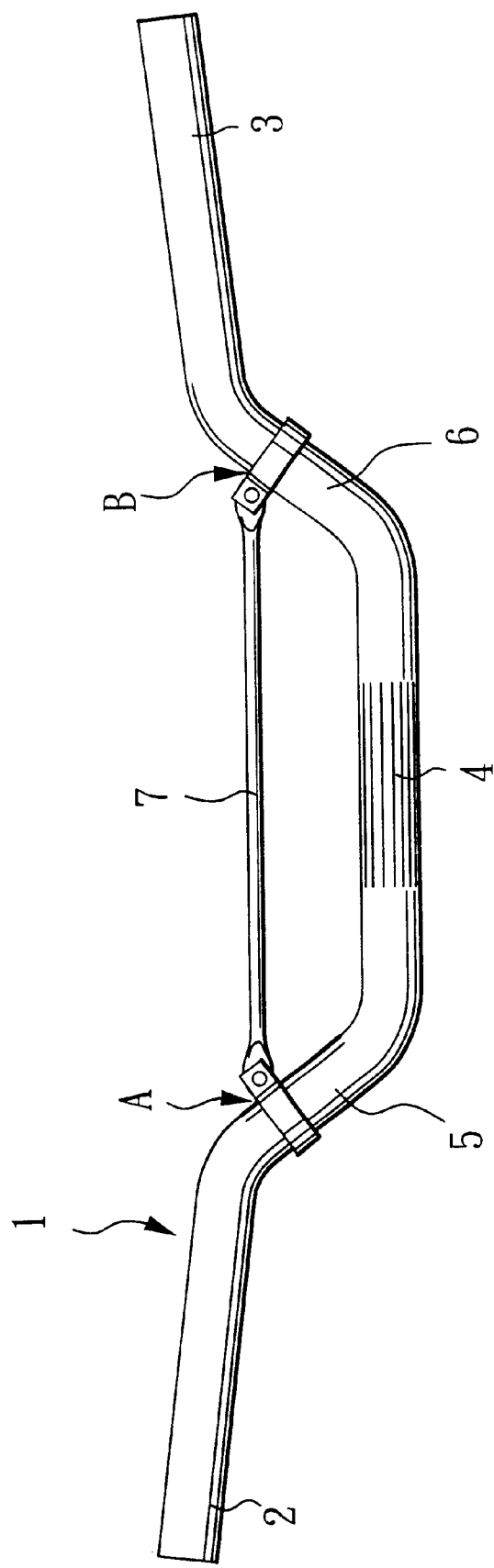
FIG. 1 is a front view of a conventional handlebar.
Figure 2:
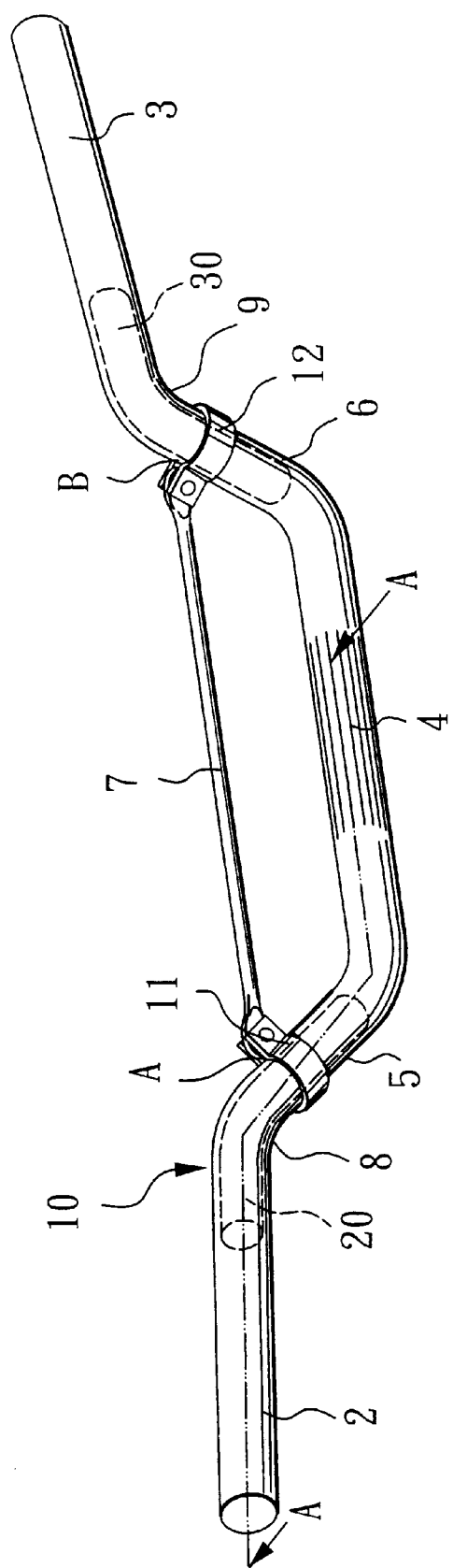
FIG. 2 is a perspective view of a handlebar according to the present invention.
Figure 3:
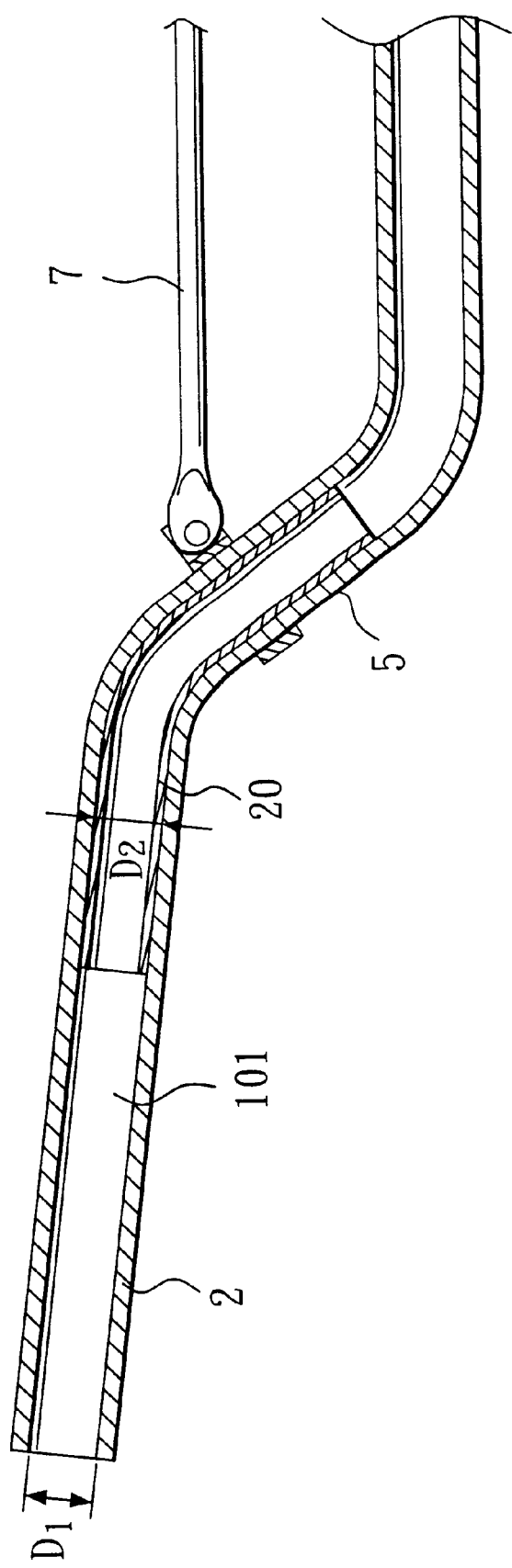
FIG. 3 shows an exploded view taken from line A—A in FIG. 2.
Figure 4:
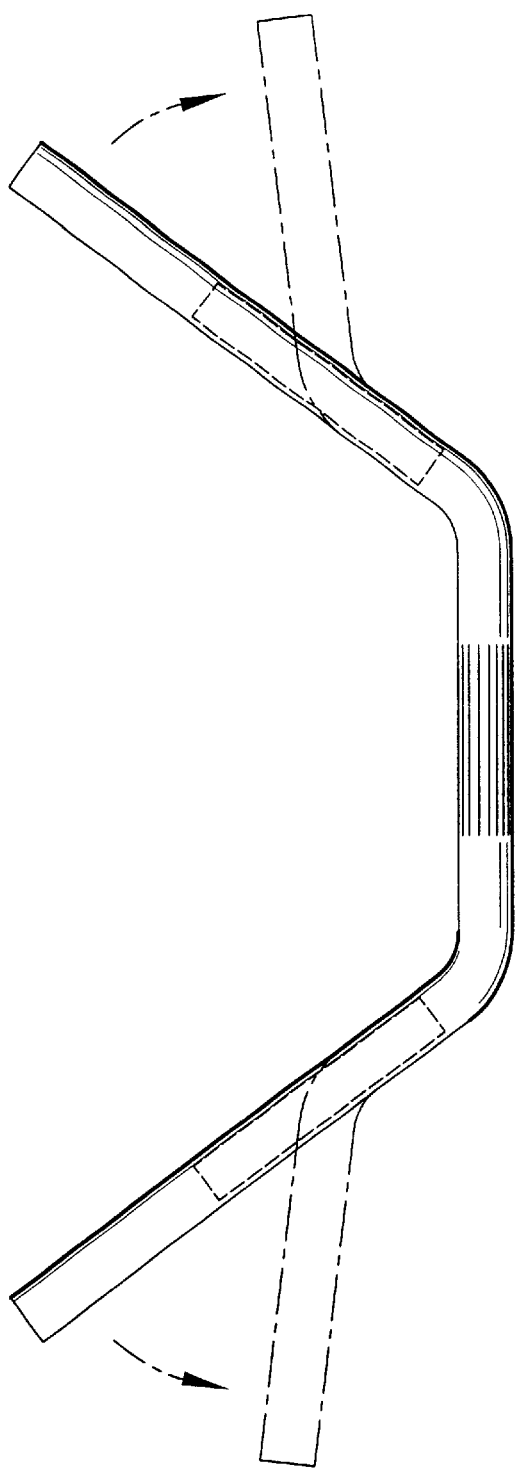
FIG. 4 shows the manner in which the handlebar according to the present invention is manufactured.
Figure 5:
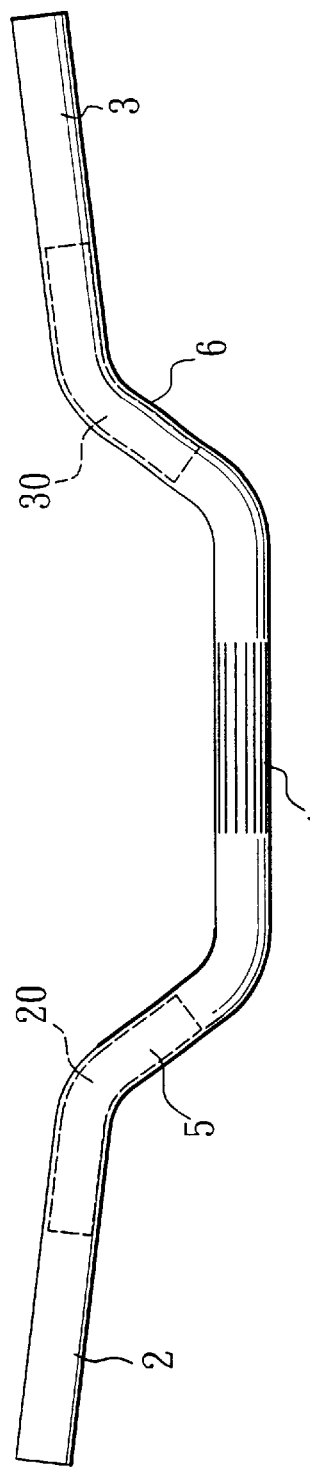
FIG. 5 shows a partial view of the handlebar according to the present invention.

Referring now to FIGS. 2 and 3, the handlebar 10 according to the present invention comprises two bent internal tubes. 20, 30, besides the members making up the conventional handlebar 1 shown in FIG. 1, namely two gripping ends 2,3, a lateral tube 4, two oblique tubes 5,6 located between the gripping ends 2(3) and lateral tube 4, respectively, and a reinforcement bar 7 having two free ends. An angle portion 8 is formed between the gripping end 2 and the oblique tube 5 while an other angle portion 9 is formed between the gripping end 3 and the oblique tube 6. The two free ends of the reinforcement bar 7 are fixedly connected to the oblique tubes 5,6, respectively, i.e. the underside of the two angle portions 8,9, by two clamps 11,12. The handlebar 10 further includes a channel portion 101 having an internal diameter D1. The two bent internal tubes 20,30 each have an external diameter D2 slightly smaller than the internal diameter D1. Thus, the two bent internal tubes 20,30 can be disposed within the hollow portion 101 around the midpoint between the gripping ends 2,3 and the oblique tubes 5,6, respectively, in such a manner that the two bent internal tubes 20,30 are inserted into the channel portion 101, as shown in FIGS. 4 and 5. The surfaces of the bent internal tubes 20,30 are in contact with the surface of the channel portion 101. The thickness of the part intermediate the gripping ends 2,3 and the oblique tubes 5,6 is increased in order to enhance the strength thereof. Thus, the two spots A, B in the oblique tubes 5,6 near the reinforcement bar 7 would not easily break when constant load is applied and concentrated thereon.

While there is shown and described herein certain specific structures embodying the present invention, it will be apparent to those skilled in the art that various modification and rearrangements of the parts may be made without departing from the spirit and scope of the underlying inventive concept.

What is claimed is:

1. A reinforced handle bar for a two-wheeled vehicle comprising:
   a) a handle bar having:
      i) an internal channel;
      ii) first and second gripping ends;
      iii) a lateral tube;
      iv) a first oblique tube connecting the first gripping end and the lateral tube and being oriented obliquely with respect to the first gripping end; and
      v) a second oblique tube connecting the second gripping end and the lateral tube, and being oriented obliquely with respect to the second gripping end;
   b) a reinforcing bar having opposing ends connected to the first and second oblique tubes;
   c) a first internal tube located in the internal channel, the first internal tube having a first portion extending into the first gripping end and a second portion extending into the first oblique tube, the first and second portions of the first internal tube oriented obliquely with respect to each other; and
   d) a second internal tube located in the internal channel, the second internal tube having a first portion extending into the second gripping end and a second portion extending into the second oblique tube, the first and second portions of the second internal tube oriented obliquely with respect to each other.

* * * * *